(12) United States Patent
Horvitz et al.

(10) Patent No.: US 7,644,427 B1
(45) Date of Patent: Jan. 5, 2010

(54) TIME-CENTRIC TRAINING, INTERFERENCE AND USER INTERFACE FOR PERSONALIZED MEDIA PROGRAM GUIDES

(75) Inventors: Eric J. Horvitz, Kirkland, WA (US); Carl M. Kadie, Bellevue, WA (US); Stuart Ozer, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 286 days.

(21) Appl. No.: 11/047,169

(22) Filed: Jan. 31, 2005

Related U.S. Application Data

(62) Division of application No. 09/825,820, filed on Apr. 4, 2001.

(51) Int. Cl.
- G06F 3/00 (2006.01)
- G06F 13/00 (2006.01)
- H04N 5/445 (2006.01)
- H04H 60/32 (2008.01)
- H04H 60/33 (2008.01)

(52) U.S. Cl. .............. 725/46; 725/9; 725/13; 725/14

(58) Field of Classification Search .......... 725/46, 725/47, 9–15
See application file for complete search history.

(56) References Cited

U.S. PATENT DOCUMENTS

| | | | |
|---|---|---|---|
| 5,410,344 A * | 4/1995 | Graves et al. ............ | 725/46 |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,758,257 A * | 5/1998 | Herz et al. ............... | 725/116 |
| 5,790,936 A | 8/1998 | Dinkins | |
| 5,801,747 A * | 9/1998 | Bedard ..................... | 725/46 |
| 5,812,865 A | 9/1998 | Theimer et al. | |
| 5,880,768 A * | 3/1999 | Lemmons et al. ........ | 725/41 |

(Continued)

FOREIGN PATENT DOCUMENTS

RU     2073931 C1     2/1997

(Continued)

OTHER PUBLICATIONS

Andy Harter, et al., A Distributed Location System for the Active Office, IEEE Network, 1994, pp. 62-70.

(Continued)

*Primary Examiner*—Dominic D Saltarelli
(74) *Attorney, Agent, or Firm*—Lee & Hayes, PLLC

(57) ABSTRACT

The present invention is related to a system and method of considering time segments or intervals in a collaborative filtering model. The present invention extends collaborative filtering approaches by integrating considerations of temporality into the training and/or vote input associated with the usage of collaborative filtering models. The present invention also applies filtering to the output with temporal models, so as to view a most appropriate subset of recommended content, centering on content that may be available at a target time. The present invention applies time to a collaborative filtering model by allowing weight to be associated with selections within a current time segment, selections historically watched within the current time segment by the user and selections historically watched within the current time segment by a large group of users.

18 Claims, 11 Drawing Sheets

U.S. PATENT DOCUMENTS

| | | | |
|---|---|---|---|
| 6,006,218 | A | 12/1999 | Breese et al. |
| 6,112,186 | A | 8/2000 | Bergh et al. |
| 6,317,881 | B1* | 11/2001 | Shah-Nazaroff et al. ...... 725/24 |
| 6,466,232 | B1 | 10/2002 | Newell et al. |
| 6,513,046 | B1 | 1/2003 | Abbott, III et al. |
| 6,519,769 | B1* | 2/2003 | Hopple et al. ................ 725/14 |
| 6,549,915 | B2 | 4/2003 | Abbott, III et al. |
| 6,637,029 | B1* | 10/2003 | Maissel et al. ............... 725/46 |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0059584 | A1* | 5/2002 | Ferman et al. ............... 725/34 |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2005/0034078 | A1 | 2/2005 | Abbott et al. |

FOREIGN PATENT DOCUMENTS

| | | |
|---|---|---|
| WO | WO 9800787 | 1/1998 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In the 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Dissemination Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

"Vocabulary of Networking Terms and Abbreviations", Cisco Systems, Inc., Moscow, Publishing House "Williams", 2002, p. 237.

A. Ansari, et al.; "Internet Recommendation Systems", Journal of Marketing Research, Aug. 2000, p. 363-375, vol. 37.

Danyel Fisher, et al.; "ASWAMI: A Framework for Collaborative Filtering Algorithm Development and Evaluation", SIGIR Forum, 2000, pp. 1-3, vol. 34.

Robin Burke; "A Semantic Rating and Heuristic Similarity for Collaborative Filtering", AAAI Press, 2000, pp. 1-7.

R.D. Lawrence, et al.; "Personalization of Supermarket Product Recommendations", Data Mining and Knowledge Discovery, 2001, p. 11-32, vol. 5, No. 1-2.

* cited by examiner

TIME-CENTRIC TRAINING, INTERFERENCE AND USER INTERFACE FOR PERSONALIZED MEDIA PROGRAM GUIDES

CROSS-REFERENCE TO RELATED APPLICATIONS

This application is a divisional of co-pending U.S. patent application Ser. No. 09/825,820, entitled "TIME-CENTRIC TRAINING, INFERENCE AND USER INTERFACE FOR PERSONALIZED MEDIA PROGRAM GUIDES", filed Apr. 4, 2001. The entirety of the above-noted application is incorporated herein by reference.

TECHNICAL FIELD

The present invention relates to information retrieval and processing, and more particularly to a system and method for providing selected information as a function of a user's previous reviewing habits over different time periods.

BACKGROUND OF THE INVENTION

Recently, there has been an increasing trend of the amount of information available on any given subject matter due to the interconnection of computers via networks (e.g., the Internet) and the increased availability of inexpensive data storage. In many situations, people attempting to retrieve information on a subject area are overwhelmed with a vast amount of information. Data that is desired becomes difficult to locate amongst the vast amount of information presented to a user. Various known information retrieval systems have evolved that attempt to avoid the problem of information overload by performing a ranking or prioritization of information. These systems attempt to retrieve and provide information based on an approximation of how useful, interesting, and/or responsive the information is likely to be to a system user.

For example, many systems provide search engines, which search database contents or "web sites" according to terms provided by a user query. However, limitations of search heuristics often cause irrelevant content to be returned in response to a query. Furthermore, the vast wealth of available information makes it difficult to separate irrelevant content from relevant content. Other systems organize content based on a hierarchy of categories. These systems suffer from the fact that a user may select a category to navigate through and determine that the content of the category is of no interest to the user. The user must then backtrack through one or more of the hierarchical categories to return to the available categories. The user then will have to continue this process until the user locates the desired information.

In view of the shortcomings of the systems discussed above, collaborative filtering systems have been developed. Collaborative filtering methods center on the construction of models that can be used to infer preferences of individuals or groups by considering the actions of a large groups of users. Collaborative filtering systems predict preferences of a user based on known attributes of the user as well as known attributes of other users. For example, a preference of a user may be whether they would like to watch a particular television show, while an attribute of the user may include their age, gender and income. In addition, the attributes can contain one or more of the user's known preferences, such as the user's dislikes of certain other shows. A user's preference can also be predicted based on the similarity of that user's attributes to other users. Typically, attributes are provided numerical values (e.g., a vote) and a weighted sum of the attribute values are utilized to determine a preference. Additionally, correlation computations are employed for a given user and other users to predict the preference of a user for a particular selection. Some collaborative filtering systems employ clustering algorithms to determine users whose preferences seem to be similar.

Collaborative filter systems have been determined to be relatively successful in selecting desirable preferences of a user given adequate attributes of the user. However, in certain circumstances a single content-access system may be employed that is utilized by multiple users all having different attributes and preferences. For example, a single household may all share a single computer or a single television device. In these circumstances, there is no way for a collaborative filtering system to determine which of the household members is utilizing the system at any given time without the member identifying themselves. Accordingly, there is an unmet need in the art for providing a collaborative filtering technique to an information retrieval and processing system that can be employed on a shared device.

SUMMARY OF THE INVENTION

The present invention is related to a system and method of considering time segments or intervals in a collaborative filtering model. The present invention extends collaborative filtering approaches by integrating considerations of temporality into the training and/or vote input associated with the usage of collaborative filtering models. The present invention also applies filtering to the output with temporal models, so as to view a most appropriate subset of recommended content, centering on content that may be available (e.g., via a broadcast) at a target time. The present invention applies time to a collaborative filtering model by allowing weight to be associated with selections within a current time segment, selections historically watched within the current time segment by the user and selections historically watched within the current time segment by a large group of users. A subset of selections based on the model is then provided to a user during a given time segment.

The system and methods have particular application to television viewing systems for providing users or groups of users with a subset of available viewing selections that may be preferred by the users employing not only the users' viewing habits, but also the users' viewing habit over particular time intervals (e.g., early morning, late morning, early afternoon, late afternoon, primetime, late night). The present invention provides for improved probability predictions that a user or group of users will want to review content based on a user's or a household's viewing habits over one or more particular time segments of the day or week. The present invention applies time to a collaborative filtering model by considering the time at which content is viewed in a household or site.

Several related methods have been developed for extending collaborative filtering to consider the time of day and/or portion of the week of desired content and/or allow for modifications of the recommendations of the collaborative filtering analysis. In one approach, votes or preferences information about desired content are considered in an explicit or implicit manner by considering votes for media content that has been viewed within the time segment or portion of week that is currently active or being considered, and to also optionally allow user's to filter recommendations over different time periods by changing the target of the recommendations (e.g., moving from next hour to next three hours, or in 3 hours from now, etc.).

In another approach, distinct models are constructed for different portions of time from data gathered from multiple users. Such time-centric collaborative filtering allows a system to cast votes based on the previous history of viewing at a site and to employ information about the content review activity of a large group of users to generate recommendations. A subset of selections based on the model is then provided to a user or group of users for a desired target time segment.

One aspect of the invention relates to applying the time segmented collaborative filtering model to selections approximately in real time. The present invention model provides for predictions of selections within a present time period of a given time segment. For example, the present invention solves the problem of the situation with a broadcast television show that is turned on that is already in progress. It also covers support of users with recommendations of media that will be broadcast within some specified time segment in the future, by considering votes and/or appropriate models for the time segment of interest, in conjunction with the availability of media content at a specified time. The time-centric recommendation system can be coupled with an electronic (e.g., potentially online) program guide, so as to produce a program guide for a specified segment and/or span of time that is dynamically filtered based on a user's preferences as inferred by employing a collaborative filtering model, potentially considering appropriate votes (e.g., for the time segment under consideration).

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

Figure 1:
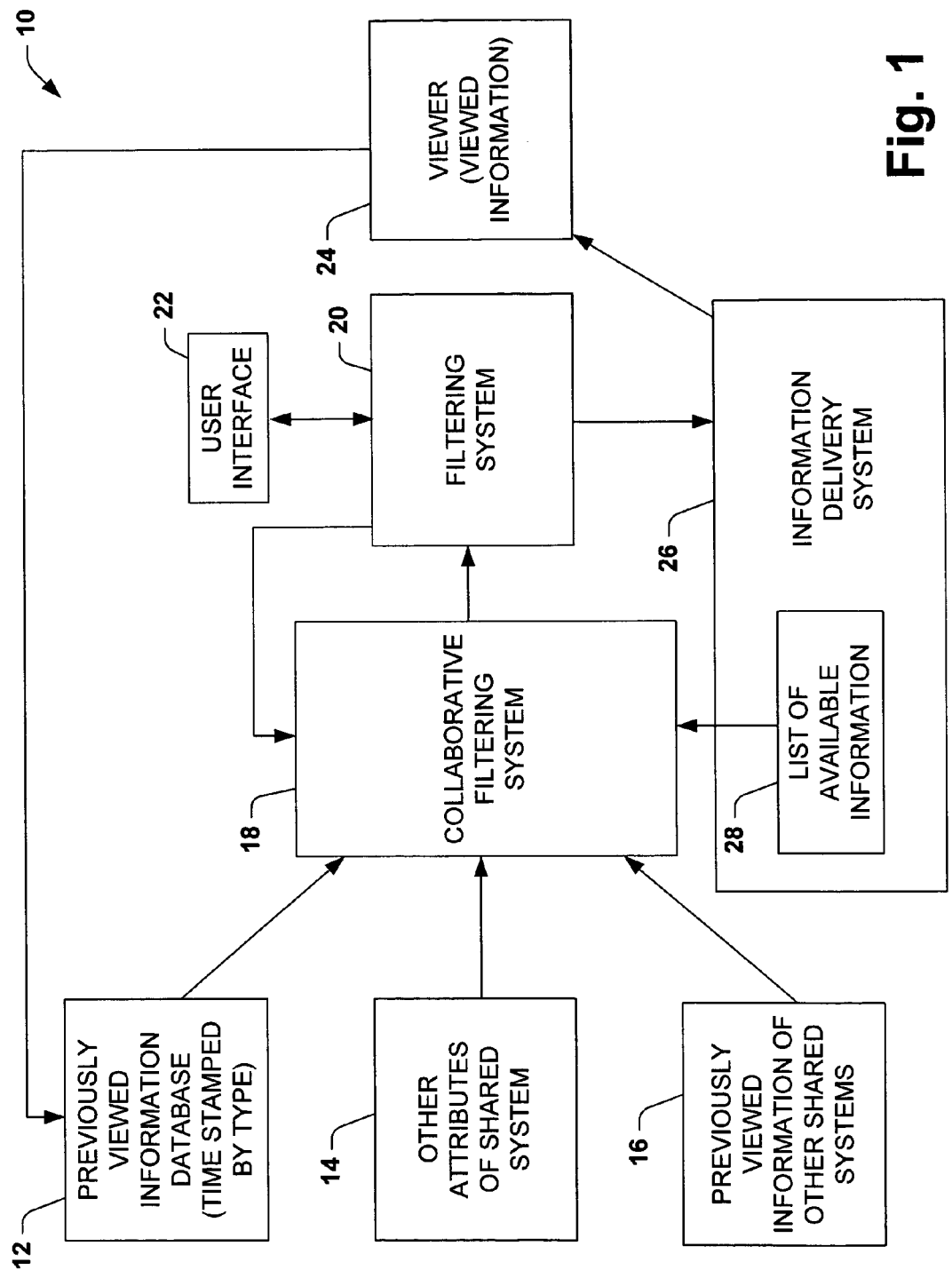
FIG. 1 illustrates a block diagram of a system utilizing an inference system based on a first collaborative filtering model in accordance with one aspect of the present invention.

The present invention is now described with reference to the drawings, wherein like reference numerals are used to refer to like elements throughout. The present invention is described with reference to a system and method for considering time segments or intervals in a collaborative filtering system. The present invention has particularly useful application to an electronic program guide system, such that recommendations of media selections most likely to be watched by a user of the system are provided based on the time interval or time segment of the selections. The collaborative filtering techniques of the present invention allow for the system to predict the likelihood that a user will prefer a program regardless of the user's genre by evaluating the time interval that is being viewed in a multi-user system.

The present invention employs collaborative filtering models or systems. The collaborative filtering models or systems of the present invention are built via learning procedures from user log data that captures the history of the review of items (e.g., media content, such as television shows) by large groups of users. Once constructed, the collaborative filtering models are used to make recommendations by inferring preferences of users. Recommendations can come in several forms including the display of a single item or list of items and the filtering and display of a custom-tailored program guide. Recommendations for a time-centric collaborative filtering system can be targeted at some specific target time or target time period. The target time period can be now, the next hour, the next two hours, or two hours from now, etc., depending on what a user has asked for and what the default is in situations where a user has not specified any specific time period.

In real-time use, a target time period is identified, and appropriate information or evidence about a user's preferences are input into the collaborative filtering model that was constructed from the user log file(s). The evidence about preferences is typically referred to as votes. Evidence or voting can take many forms, including explicit input of samples of preferred items by users (e.g., some systems ask the user to input votes that a user likes and then inputs these to the previously constructed collaborative filtering model). Evidence of preferences also includes the gathering of implicit evidence of items that are liked or disliked via monitoring of a user's activity. For example, evidence of a user's preferences can be gathered implicitly by monitoring content that the user has dwelled on for some threshold amount of time-taking the dwell time as a surrogate of interest. Interest can also be inferred by monitoring items that the user has requested to be recorded. A user reviewing an item over a threshold period of time can be an indication that the user is interested in the item and similar type items. Furthermore, a brief review and jump away from a selected item to other content can be inferred to as a dislike, or negative vote.

The present invention also allows users to explicitly modify votes being considered by giving them a means of adding items or removing them by editing a list of votes. The evidence or votes about a user's, site's, or household's preferences considered is the history, recent or long-term, of items reviewed by the household. A reviewed items list includes the positive and/or negative votes that are implicitly monitored by looking at patterns of dwell time and jumping. The reviewed items list can be limited by any number of filtering techniques. For example, a time-centric reviewed items list can be provided by tagging the reviewed items by time period when they are reviewed, and only considering the shows that have tags consistent with the target time period when recommendations are made. The reviewed items list can capture the history of review of information content at a site including the pooling of history data from multiple systems at a site or considering only a single system for some threshold period of time.

FIG. 1 illustrates an example of a system 10 utilizing a collaborative filtering system 18 according to one aspect of the present invention. In a training mode, the collaborative filtering system 18 utilizes selections of previously viewed information that is logged in a user's database 12 and selections of previously viewed information that is logged in databases 16 of other shared systems. It is to be appreciated that the database information may be stored locally at the system 10, remotely at a remote server or the like (e.g., in a single database) or across a number of servers. Additionally, the collaborative filtering system 18 may reside locally at the system 10, remotely at a remote server or across a number of servers. The collaborative filtering system 18 is trained by examining selection reviewed by a large pool of users for more than a threshold amount of time. Negative votes are also considered by monitoring selections jumped away from after being reviewed briefly. Temporal filtering can then be employed to provide a reviewed item list and a recommendation list for a particular time segment.

Title selections are time stamped with different time segments by event type (e.g., title). The log data is annotated with distinctions about the time of the day that a system user has viewed the information. For example, a day can be segmented into early morning, mid-morning, afternoon, late afternoon, early evening, evening, late night. Additional segments can include information that is viewed on weekdays versus weekends. Furthermore, non-weekdays can be further subdivided into Saturday, Sunday and holidays. Elements from a dataset are considered tagged with these time segments or intervals and trained with this data employing conventional collaborative filtering techniques. Various collaborative filtering techniques may be employed to carry out the present collaborative filtering model (e.g., correlation techniques, Bayesian machine learning, probability tree networks, etc.).

In real-time, a target time period is identified by a user interface 22 and appropriate information or evidence about a user's preferences is inputted into the collaborative filtering system 18. Evidences of preferences include information from previously selected information from the database 12, other attributes of the shared system 14 and explicit input of samples of preferred items by the user through the user interface 22. Evidence of the user's preference is largely gathered by implicit evidence of items that are liked or disliked by monitoring the user's activity. A positive vote is given to an item that the user dwells over for a threshold period of time, while negative votes are given to items that are briefly reviewed and jumped away from for review of other content.

Furthermore, a user via the user interface 22 may select an item for a positive or negative vote. For example, in a first iteration a user may be presented with a list of reviewed items for a selected time period. A user may then select amongst a variety of filtering components residing in a filtering system 20. Additionally, the user may select or provide positive or negative votes for items. The modified or filtered reviewed item list may then be inputted into the collaborative filtering system 18 as further evidence of user preferences. The collaborative filtering system 18 can then provide a recommendation list of items ranked by preference that a user may be interested in based on all preferences inputted into the collaborative filtering system 18.

The collaborative filtering system 18 ranks selections based on viewing habits of users of the system 10 in addition to being able to consider time segments or intervals of those viewing habits. The collaborative filtering system 18 considers the temporal history of the content viewed by users of the system (e.g., a multi-user system) and dates the list of available information 28 (e.g., available media) that will be made available by an information delivery system 26. The collaborative filtering system 18 scores active user events for every title stored in the database 12. The collaborative filtering system 18 can also only consider those titles that are relevant. For example, if the user asks for recommendations about titles currently viewable, then only those titles need be considered. The collaborative filtering system 18 then provides a reviewed items list and a ranked selectable information list based on a requested time period to the user interface 22 via the filtering system 20. The ranked selectable information list contains recommendations of selectable titles within the time period requested from a particular time segment via the user interface 22. The collaborative filtering system 18 provides the ranked set of titles that may be of interest to a system user based on similar titles that the users of the system have historically viewed in that time segment. The filtering system 20 includes various filters for adding, deleting or modifying the reviewed items list (e.g., assigning positive or negative votes to items) and inputting the new evidence of preferences into the collaborative filtering system 18 for updating of the reviewed items list and the ranked selectable information list. For example, a popularity filter may be employed to provide shows of interest that users of the system are not likely to know about. Furthermore, text descriptions of items may be added to the reviewed item list employing a search engine or the like. The new preferences may be inputted into the collaborative filtering system 18 and a new recommendation list generated.

The user interface 22 is provided with functionality to allow a user to select between the ranked selectable information set. Once a selection of a title to view is made by a user via the user interface 22, a request is transmitted to the information delivery system 26, which transmits the requested information corresponding to the selected title to a viewer 24. The viewed information is then transmitted back to the previously viewed information database 12 for logging and for providing the viewed title and time segment information to the collaborative filtering system 18. The viewed information may be employed in additional training modes to ensure that the collaborative filtering system 18 is continuously and automatically updated with the latest viewing information. Alternatively, training can be employed remotely and the collaborative filtering system 18 periodically updated. If the ranked selectable information set is not adequate for a particular time segment covering the time period requested, the collaborative filtering system 18 automatically broadens the particular time segment into additional time segments or autobroadens the ranked selectable information set. Alternatively, the ranked selectable information set can be autobroadened by the filtering system 20.

Figure 2:
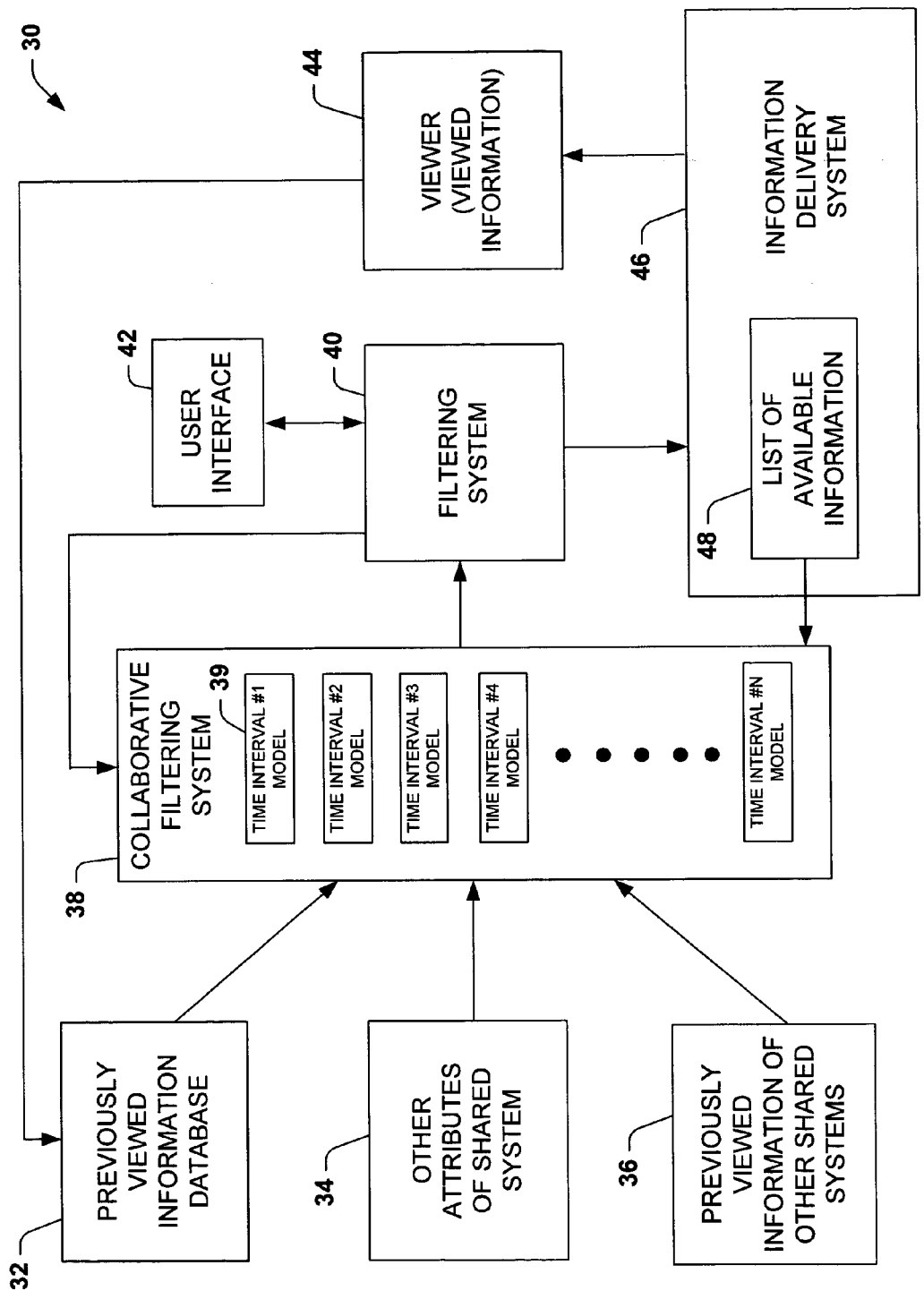
FIG. 2 illustrates a block diagram of a system utilizing an inference system based on a second collaborative filtering model in accordance with one aspect of the invention.

FIG. 2 illustrates an example of a system 30 utilizing a collaborative filtering system 38 according to another aspect of the present invention. In a training mode, a plurality of time interval models 39 in the collaborative filtering system 38 are trained utilizing selections of previously viewed information over a respective time interval that is logged in a user's database 32 and selections of previously viewed information that is logged in databases 36 of other shared systems over the same respective time interval. Each time interval model 39 of the collaborative filtering system 38 is trained by examining selection reviewed by a large pool of users for more than a threshold amount of time within a corresponding time interval. Negative votes are also considered by monitoring selections jumped away from after being reviewed briefly within the corresponding time interval. A reviewed item list and a recommendation list for a particular time period is provided by the particular time interval model 39 associated with a time interval covering the time period requested.

Title selections are time stamped or tagged with different time segments by event type (e.g., title). The log data is annotated with distinctions about the time of the day that a system user has viewed the information. The time stamps and tags are employed in both the training mode for the time interval of the selection and in the real-time mode for providing reviewed items within a time period requested. Various collaborative filtering techniques may be employed to carry out the present collaborative filtering system (e.g., correlation techniques, Bayesian machine learning, probability tree networks, etc.).

In real-time, a target time period is identified by a user interface 42 and appropriate information or evidence about a user's preferences is inputted into a time interval model 39 associated with the requested time period. Evidences of preferences include information from previously selected information from the database 32 within the time interval, other attributes of the shared system 34 and explicit input of samples of preferred items by the user through the user interface 42. Evidence of the user's preferences is largely gathered by implicit evidence of items that are liked or disliked by monitoring the user's activity. A positive vote is given to an item that the user dwells over for a threshold period of time, while negative votes are given to items that are briefly reviewed and jumped away from for review of other content. Furthermore, a user via the user interface 42 may select an item for a positive or negative vote. A user may also select amongst a variety of filtering components residing in a filtering system 40. The collaborative filtering system 38 can then provide a recommendation list of items ranked by preference that a user may be interested within a requested time period based on all preferences inputted into the respective time interval model 39 covering the requested time period.

The respective time interval model 39 of the collaborative filtering system 38 then provides a reviewed items list and a ranked selectable information list based on a requested time period within the time interval to the user interface 42 via the filtering system 40. New preferences may be inputted into a respective time interval model 39 of the collaborative filtering system 38 and a new recommendation list generated. The user interface 42 is provided with functionality to allow a user to select between the ranked selectable information set. Once a selection of a title to review is made by a user via the user interface 42, a request is transmitted to the information delivery system 46, which transmits the requested information corresponding to the selected title to a viewer 44. The viewed information is then transmitted back to the previously viewed information database 32 for logging and for providing the viewed title and time segment information to the collaborative filtering system 38. The viewed information may be employed in additional training modes to ensure that the time interval models of the collaborative filtering system 38 are continuously and automatically updated with the latest viewing information.

Figure 3:
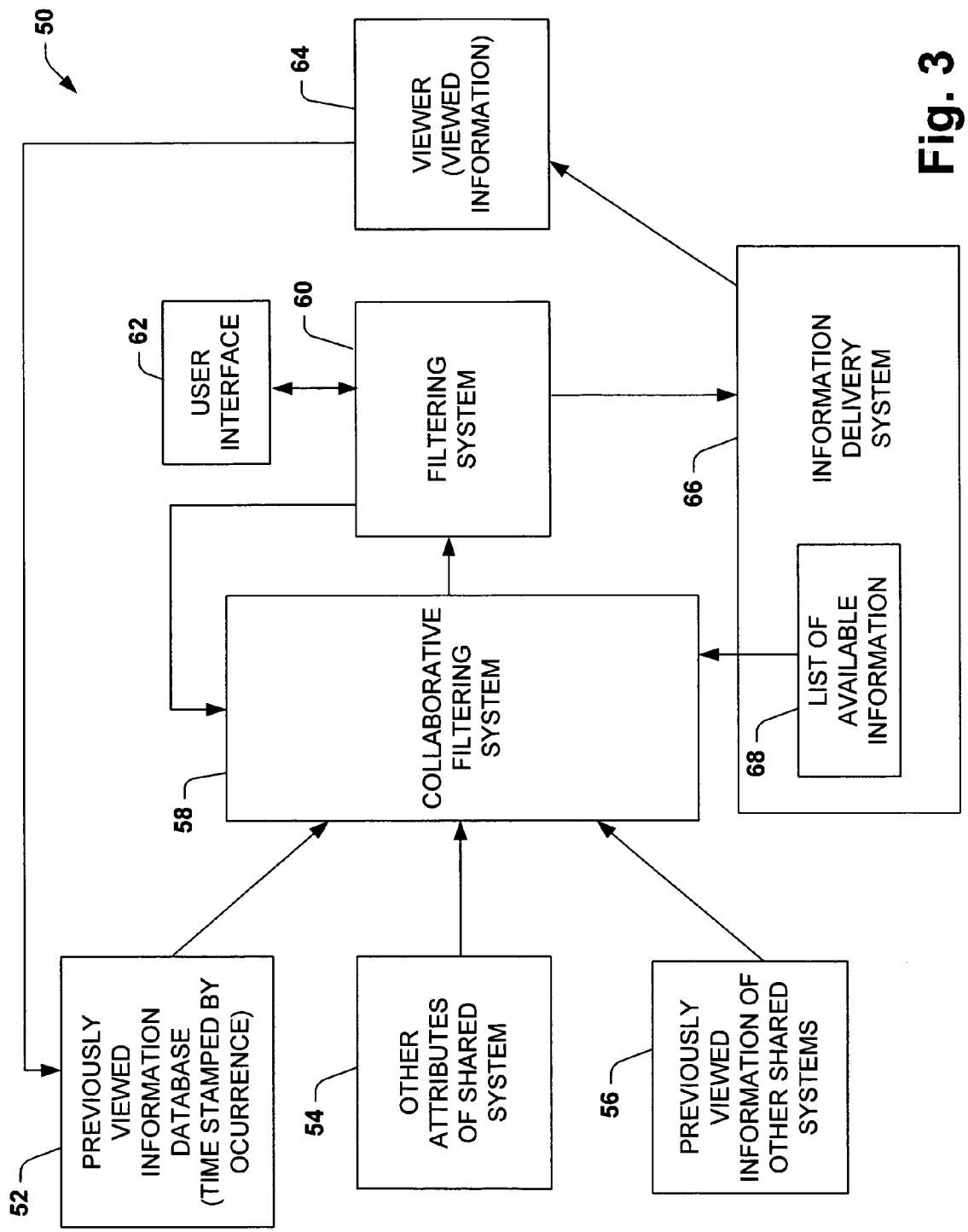
FIG. 3 illustrates a block diagram of a system utilizing an inference system based on a third collaborative filtering model in accordance with one aspect of the invention.

FIG. 3 illustrates an example of a system 50 utilizing a collaborative filtering system 58 according to yet another aspect of the present invention. The collaborative filtering system 58 employs a single collaborative filter model in which previously viewed information is provided with a time stamp according to event occurrence for each time interval or segment. In other words, a title being selected within two different time intervals is treated as different event occurrences, such that training is performed as if the event occurrence has occurred with a totally different title. Again, various collaborative filtering techniques may be employed to carry out the collaborative filtering system 58.

In a training mode, the collaborative filtering system 58 utilizes selections of previously viewed information that is logged in a user's database 52 and selections of previously viewed information that is logged in databases 56 of other shared systems by the item and the time the item was reviewed for some threshold amount of time by users. Additionally, negative votes can be defined as items that a user has jumped away from after a minimal amount of review time. It is to be appreciated that the database information may be stored locally at the system 50, remotely at a remote server or the like (e.g., in a single database) or across a number of servers. Additionally, the collaborative filtering system 58 may reside locally at the system 50, remotely at a remote server or across a number of servers. The collaborative filtering system 58 is trained by examining selection reviewed by a large pool of users for more than a threshold amount of time by the item and the time the item was reviewed. Temporal filtering can then be employed to provide a reviewed item list and a recommendation list for a particular time segment or interval. Title selections are time stamped with different time segments by item or event type (e.g., title) and the time the event was reviewed. The log data is annotated with distinctions about the time of the day that a system user has viewed the information. Various collaborative filtering techniques may be employed to carry out the present collaborative filtering model (e.g., correlation techniques, Bayesian machine learning, probability tree networks, etc.).

In real-time, a target time period is identified by a user interface 62 and appropriate information or evidence about a user's preferences is inputted into the collaborative filtering system 58. Evidences of preferences include information from previously selected information from the database 52, other attributes of the shared system 54 and explicit input of samples of preferred items by the user through the user interface 62. Evidence of the user's preference is largely gathered by implicit evidence of items that are liked or disliked by monitoring the user's activity. Furthermore, a user via the user interface 62 may select an item for a positive or negative vote. The collaborative filtering system 58 can then provide a recommendation list of items ranked by preference that a user may be interested in based on all preferences inputted into the collaborative filtering system 58.

The collaborative filtering system 58 ranks selections based on viewing habits of users of the system 60 in addition to being able to consider time segments or intervals of those viewing habits. The collaborative filtering system 58 considers the temporal history of the content viewed by users of the system (e.g., a multi-user system) and dates the list of available information 68 (e.g., available media) that will be made available by an information delivery system 66. The collaborative filtering system 58 then provides a reviewed items list and a ranked selectable information list based on a requested time period to the user interface 62 via the filtering system 60. The ranked selectable information list contains recommendations of selectable titles within the time period requested from a particular time segment via the user interface 62. The collaborative filtering system 58 provides the ranked set of titles that may be of interest to a system user based on similar titles that the users of the system have historically viewed in that time segment. The filtering system 60 includes various filters for adding, deleting or modifying the reviewed items list (e.g., assigning positive or negative votes to items) and inputting the new evidence of preferences into the collaborative filtering system 68 for updating of the reviewed items list and the ranked selectable information list. The new preferences may be inputted into the collaborative filtering system 58 and a new recommendation list generated.

The user interface 62 is provided with functionality to allow a user to select between the ranked selectable information set. Once a selection of a title to view is made by a user via the user interface 62, a request is transmitted to the information delivery system 66, which transmits the requested information corresponding to the selected title to a viewer 64. The viewed information is then transmitted back to the previously viewed information database 52 for logging and for providing the viewed title and time segment information to the collaborative filtering system 58. The viewed information may be employed in additional training modes to ensure that the collaborative filtering system 58 is continuously and automatically updated with the latest viewing information. Alternatively, training can be employed remotely and the collaborative filtering system 58 periodically updated.

It is to be appreciated that the present invention is particularly suited for providing selected titles of programs or other multimedia utilizing an electronic programming guide. In this application, multiple members or users in a family utilize a single television system making it improbable to determine preferences for any particular member of the family. Therefore, the present system and method are ideally suited for this application because household viewing habits are typically consistent at different times of a day for weekdays versus weekends verse holidays. For example, children may watch children shows early Saturday mornings, while adults may watch different types of shows at different time periods, for example, soap operas at midafternoon, sports on weekends, news at night and more adult oriented shows late at night. The collaborative filtering models of the present invention apply time segmenting to an electronic programming guide for providing recommendations of program selections based on the temporal history of media viewing habits in a household.

Figure 4:
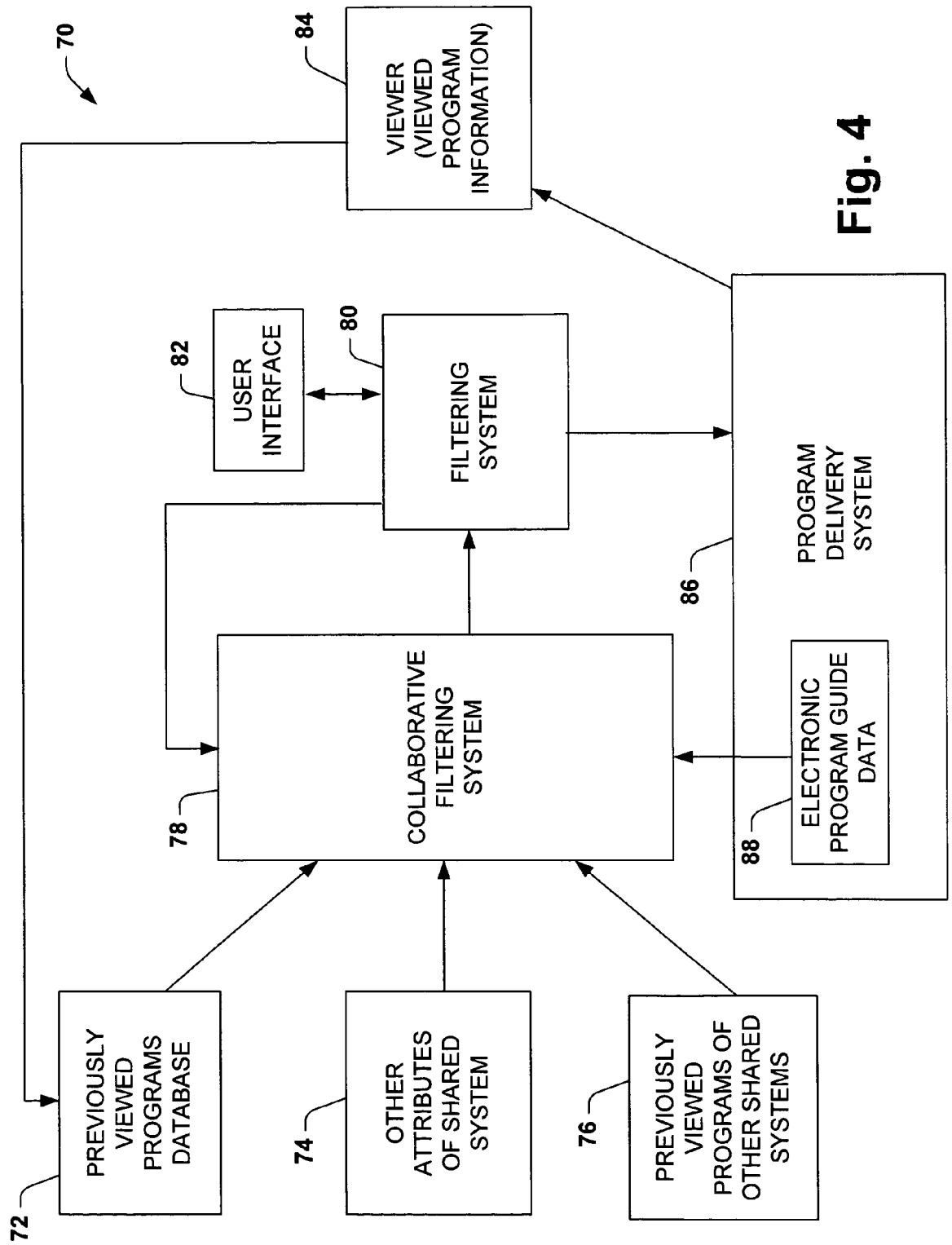
FIG. 4 illustrates a block diagram of an inference system being employed in a multimedia viewing system utilizing an electronic program guide in accordance with one aspect of the present invention.

FIG. 4 illustrates an example of an electronic programming guide system 70 utilizing a collaborative filtering system 78 employing time based collaborative filtering techniques. In a training mode, the collaborative filtering system 78 utilizes selections of previously viewed information that is logged in a user's database 72 and selections of previously viewed information that is logged in databases 76 of other shared systems. The collaborative filtering system 78 is trained by examining selections reviewed by a large pool of users for more than a threshold amount of time. Negative votes are also considered by monitoring selections jumped away from after being reviewed briefly. The collaborative filtering system can be trained based on any of the techniques illustrated in FIGS. 1-3.

The collaborative filtering system 78 ranks selections based on viewing habits of users of the system 70 in addition to considering time segments or intervals of those viewing habits. Various collaborative filtering techniques may be employed to carry out the present collaborative filtering model application with respect to an electronic programming guide. In real-time, a target time period is identified by a user interface 82 and appropriate information or evidence about a user's preferences is inputted into the collaborative filtering system 78. The collaborative filtering system 78 considers the temporal history of the programs viewed by users of the system (e.g., family members of a household) and dates and times of electronic program guide data 88 of available programs that can be made available by a program delivery system 86. The collaborative filtering system 78 is operable to receive other attributes 74 of the shared system (e.g., family profile information by family member, family profile information by family viewing time intervals). Evidence of preferences can also include explicit input of samples of preferred items by the user through the user interface 82.

Evidence of the user's preference is largely gathered by implicit evidence of shows that are liked or disliked by monitoring the user's viewing activity. A positive vote is given to a program that the user watches for a threshold period of time, while negative votes are given to shows that are briefly watched and jumped away from for review of other shows. Furthermore, a user via the user interface 82 may select an item for a positive or negative vote. For example, in a first iteration a user may be presented with a list of reviewed programs for a selected time period. A user may then select amongst a variety of filtering components residing in a filtering system 80. Additionally, the user may select or provide positive or negative votes for items. The modified or filtered reviewed item list may then be inputted into the collaborative filtering system 78 as further evidence of user preferences. The collaborative filtering system 78 can then provide a recommendation list of programs ranked by preference that a user may be interested in based on all preferences inputted into the collaborative filtering system 78.

The collaborative filtering system 78 ranks selections based on viewing habits of users of the system 70 in addition to being able to consider time segments or intervals of those viewing habits. The collaborative filtering system 78 and/or temporal filters are employed to consider the temporal history of the shows viewed by users of the system (e.g., a multi-user system) and dates the list of available information 88 (e.g., available media) that will be made available by an information delivery system 86. The collaborative filtering system 78 then provides a reviewed items list and a ranked selectable information list based on a requested time period to the user interface 82 via the filtering system 80. The ranked selectable information list contains recommendations of selectable programs within the time period requested from a particular time segment via the user interface 82. The collaborative filtering system 78 provides the ranked set of programs that may be of interest to a system user based on similar programs that the users of the system have historically watched in that time segment.

The filtering system 80 includes various filters for adding, deleting or modifying the reviewed items list (e.g., assigning positive or negative votes to items) and inputting the new evidence of preferences into the collaborative filtering system 78 for updating of the reviewed items list and the ranked selectable information list. For example, a popularity filter may be employed to provide shows of interest that users of the system are not likely to know about. Furthermore, text descriptions of items may be added to the reviewed item list employing a search engine or the like. The new preferences may be inputted into the collaborative filtering system 78 and a new recommendation list generated.

The collaborative filtering system 78 receives titles of previously viewed programs that are logged in a database 72. Each title is time stamped with different time segments and the percentage of the complete program that the user has watched the program is logged in the database 72. The log data is annotated with distinctions about the time of the day that a system user has watched the television program. As previously mentioned, a day can be segmented into early morning, mid-morning, afternoon, late afternoon, early evening, evening, late night. Additional segments can include information that is viewed on weekdays verse weekends. Furthermore, non-weekdays can be further subdivided into Saturday, Sunday and holidays. Elements from a dataset are considered tagged with these time segments or intervals and trained with this data employing conventional collaborative filtering techniques.

The output provided to the user at the user interface 82 is a personalized program guide for upcoming broadcasted media (e.g., a view of the content in the next hour or next several hours that is sorted by inferred user preferences). A filtering system 80 is coupled to the user interface 82. The filtering system 80 receives a reviewed program list from the collaborative filtering system 78, directly from the previously viewed programs database 72 or some other mechanism coupled to the previously viewed programs database 72. The filtering system 80 provides the functionality associated with various filters that can be invoked through the user interface component 82. Once a selection of a title to view is made by a user via the user interface 82, a request is transmitted to the information delivery system 86 by the filtering system 80. The program delivery system 86 transmits the requested program corresponding to the selected title to a viewer 84. Information about the viewed program is then transmitted back to the previously viewed programs database 72 for logging and for providing the viewed information to the collaborative filtering system 78 for further training of the collaborative filtering system 78. Therefore, the collaborative filtering system 78 is continuously and automatically being updated with the latest viewed programs. If the reviewed items list and the recommended items list are not adequate for a particular time segment covering the time period requested, the collaborative filtering system 78 automatically broadens the particular time segment into additional time segments. Alternatively, the reviewed items list and the recommended items list can be autobroadened by the filtering system 80 via the user interface 82.

Figure 5:
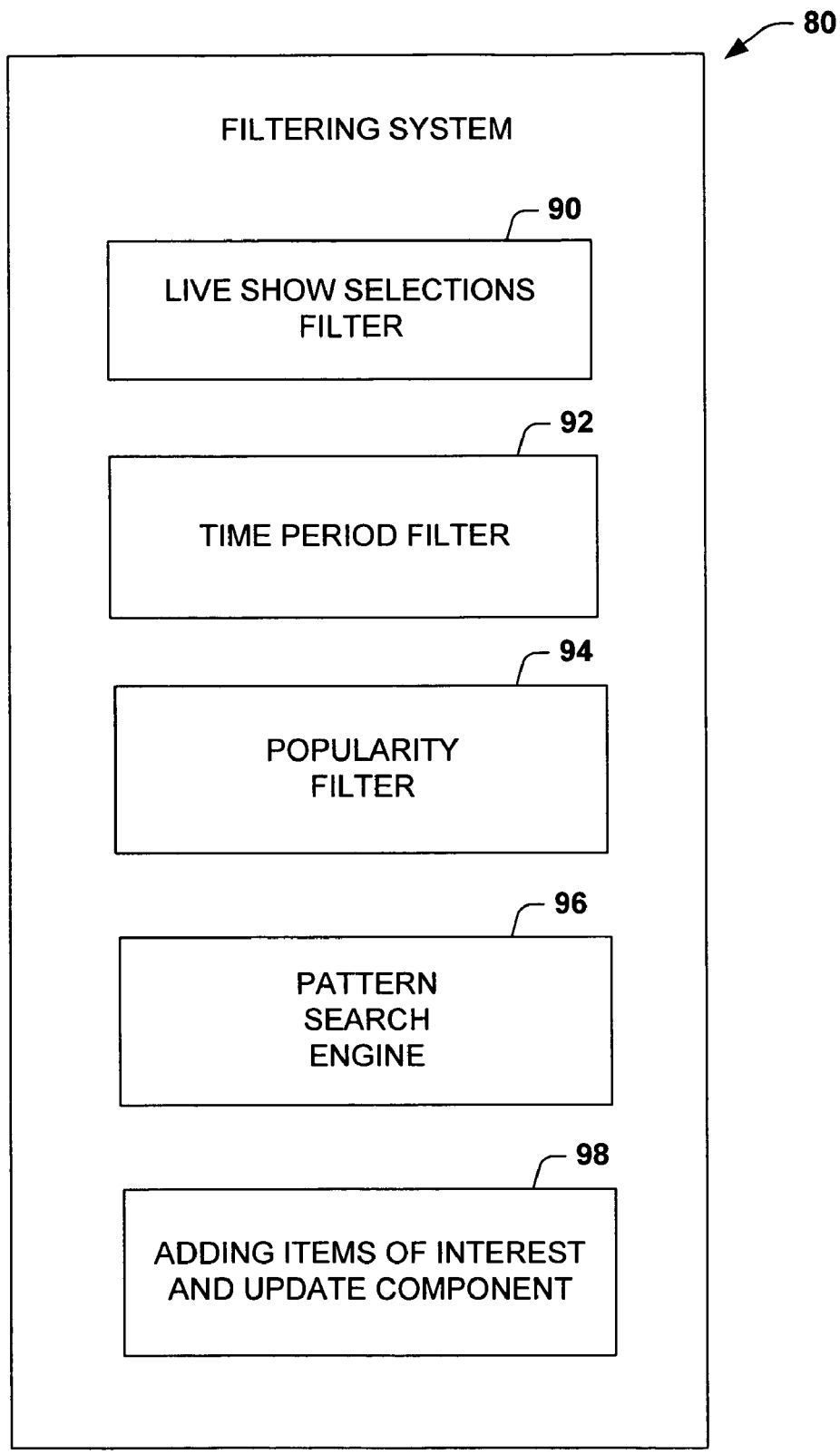
FIG. 5 illustrates a block diagram of an example of possible ranked program sets in accordance with one aspect of the present invention.

FIG. 5 illustrates a block diagram of possible components associated with the filtering system 80. The filtering system 80 comprises a live show selection filter 90. The live show selection filter 90 provides recommendations for live programs already in progress that a user may wish to catch at any given time period. The live show selections are programs that are currently in progress that are being recorded by the system based on determined preferences of the users of the system, and are only limited by the amount of available recording space and available tuners. A time period filter 92 is a temporal filter that filters out the recommended shows by time period based on a time period requested. The time period filter 92 can also be adapted to provide the functionality of the live show selections filter 90 if a selection of "now" is selected. The recommended show selections provided by the time period filter include ranked shows based on selections that a user is most likely to watch at a future time period predicted by utilizing the shared system history for the time interval covering the requested time period.

A popularity filter 94 is also provided. The popularity filter employs popularity techniques by scoring selection based on the probability that the user would not know about the selection. For example, a popularity of a selection may be evaluated by multiplying a collaborative filter score of a selection by one minus the probability that the user may know of the selection or by multiplying the collaborative filter score by the probability that the user does not know of the selection. A patterns search engine 96 is also provided so that text and genre can be inputted into the system 70 as evidence of preferences to the collaborative filtering system 78. The filtering system 80 also includes an adding items of interest and update component 98. The adding items of interest and update component 98 allows a user to edit, modify and update a reviewed selections list, so that the modified list can be input into the collaborative filtering system 78.

Figure 6:
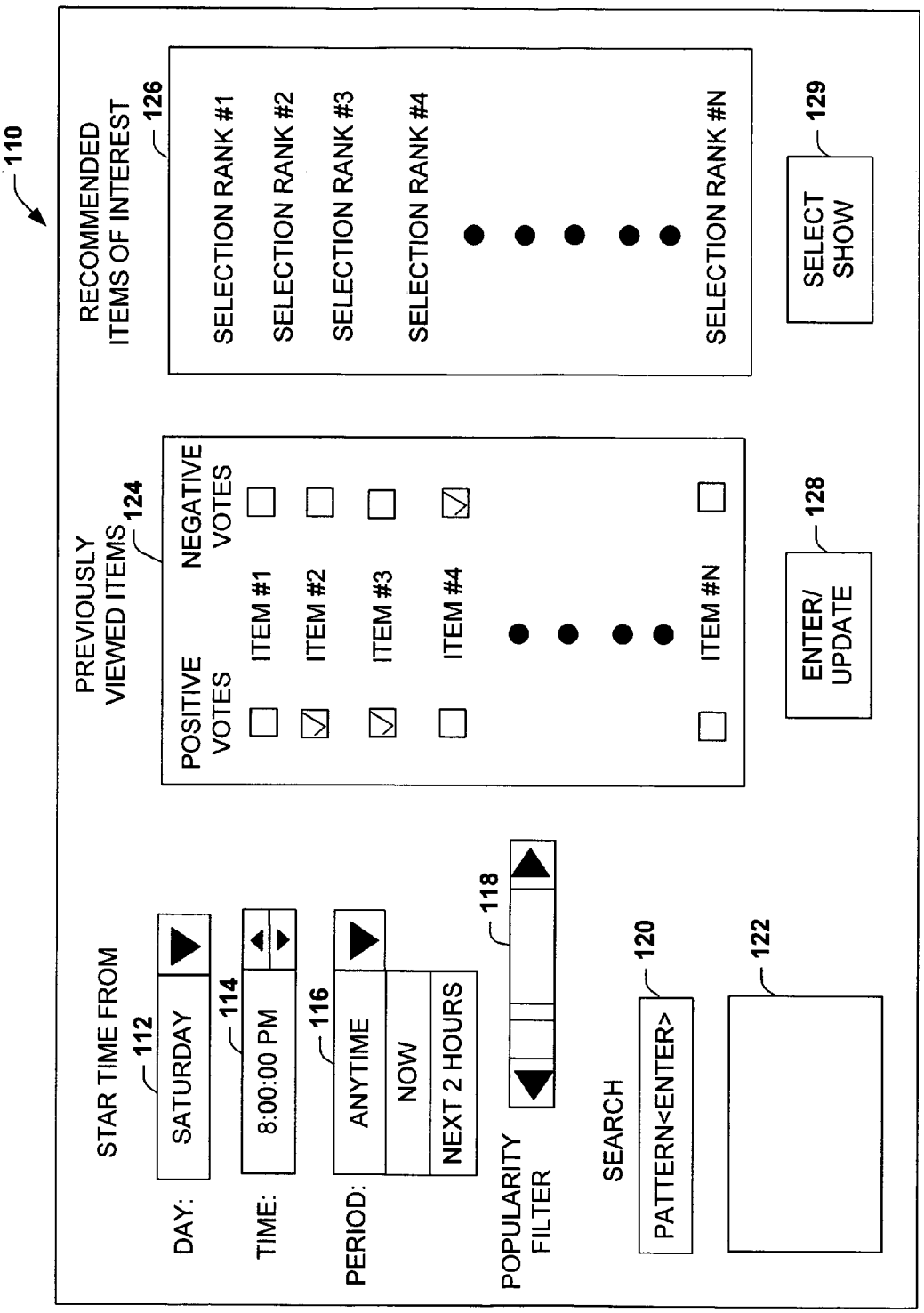
FIG. 6 illustrates a block diagram of a possible user interface of an electronic program guide in accordance with one aspect of the present invention.

FIG. 6 illustrates an example of a possible user interface 110 that allows a user to review available selections that a user is interested in quickly without unduly searching, for example, via a remote control. A day scroll down menu 112 and a time scroll down menu 114 are provided to allow a user to select a start time for providing recommendations of program selections to the user. A period scroll down menu 116 is also provided that allows a user to select a time period for providing suggested program selections. The period scroll down menu 116 illustrates a few possible selections that a user can select, such as "anytime", "now" (e.g., live selections) or "next two hours". Other selections may be provided, such as "next 12 hours", "next day", "next week", "2 hours from now", etc. Once a user has selected a date and time to start from and a time period, the user can then select an "enter/update" button 128. A plurality of recommended selections is then provided to the user in a "recommended items of interest" window 126. The selections fall within the time period requested, and are ranked according to selections that the user is most likely to be interested in viewing (e.g., inferred strength) based on employing collaborative filtering techniques on historical data for a time interval encompassing the requested time period.

A second window 124 is provided that includes a "previously viewed items" list. The "previously viewed items" list includes a plurality of items that have been reviewed by users of the system. Items that the user has reviewed for a threshold period of time within the time period selected are assigned a positive vote as indicated by a check mark in a box located in a positive vote column. Items that the user has jumped away from after being reviewed briefly within a time period selected are assigned a negative vote as indicated by a check mark in a box located in a negative vote column. The "previously viewed items" is input into the collaborative filtering system to provide the recommended items in the window 126. The "previously viewed items" is editable such that the user can edit or assign positive and negative votes to an item and select the "enter/update" button 128 to modify the recommended items of interest in the window 126.

A population filter selection slide 118 is provided to allow a user to adjust a popularity filter. The popularity filter evaluates selections that are likely to be of interest to a user that the user is most likely not to know about. For example, a selection can be assigned a value by multiplying the collaborative filter value by the probability that the user did not know about the selection. If the population selection box is selected, a plurality of selections that a user does not know about, but may find of interest, is provided in the recommended items of interest window 126. Additionally, a first search window 120 is provided for allowing a user to enter patterns of type or text and/or conduct type or text searches for updating the evidence about the kind of show that the user is interested in reviewing. A second search window 122 is provided for displaying the results of the pattern search. A user may select to view a show of interest by selecting a show in the "recommended items of interest" window 126 and selecting the "select show" button 129.

It is to be appreciated that the electronic programming guide system of the present invention may reside on a television set top box. Alternatively, portions of the electronic programming guide system may reside on a television set top box and portions of the electronic programming guide system may reside on a remote server system. A remote server system is further suited for applications in which general recommendations are made to customer's forming different clusters. For example, different cluster groups can be determined by analyzing the historical viewing of a plurality of customers. A set of general recommendations can then be determined for each cluster by utilizing the collaborative filtering techniques of the present invention. A general set of recommendations can then be provided to each user of a cluster based on viewing habits within particular time intervals and available shows within the time interval.

Figure 7:
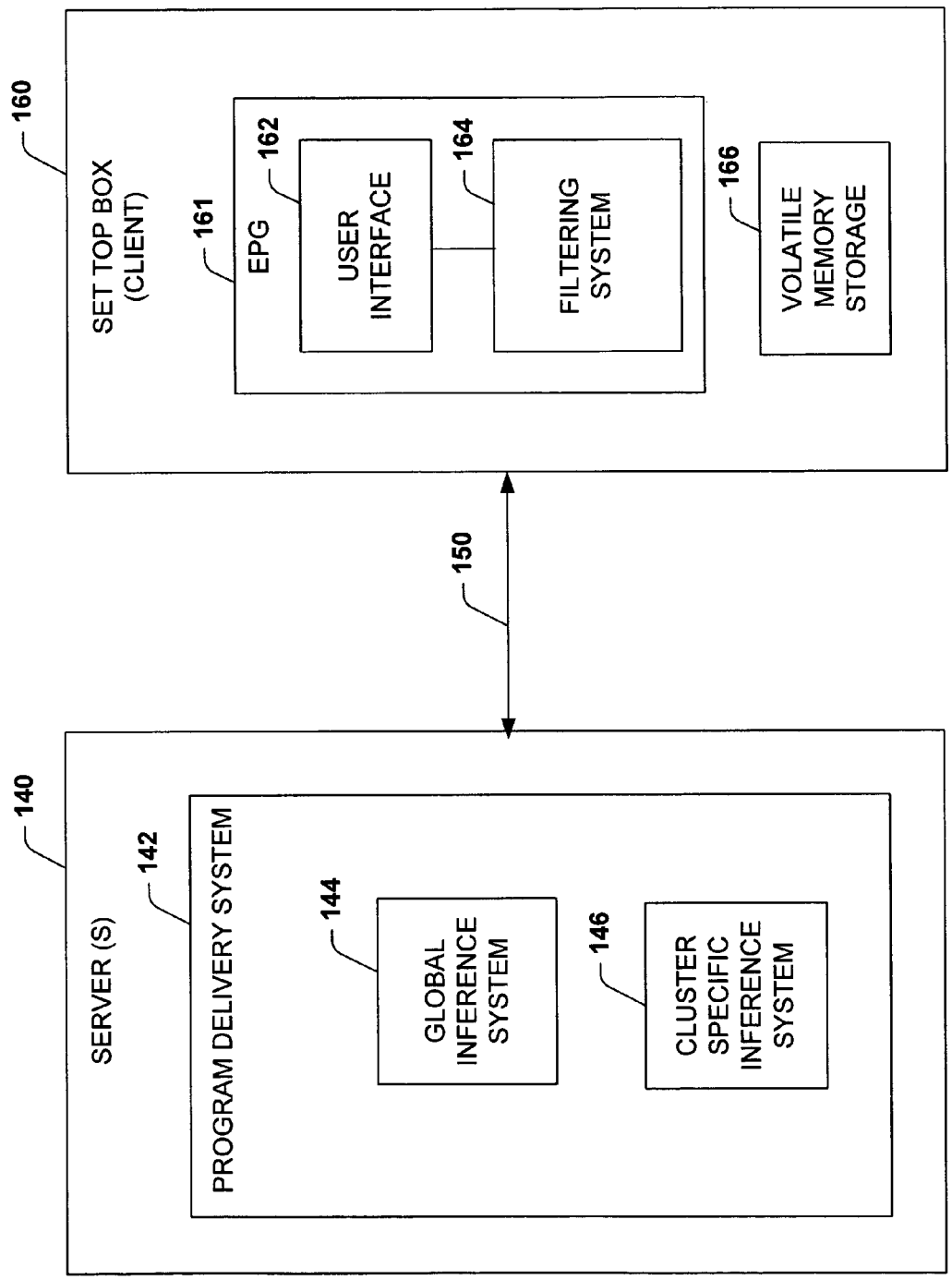
FIG. 7 illustrates a block diagram of a program delivery system residing on a server coupled to a set top box having an electronic program guide system in accordance with one aspect of the present invention.

FIG. 7 illustrates a program delivery system 142 that resides on a server 140 coupled to a set top box 160 of a client via a communication link 150. The program delivery system 142 includes a global inference system 144 and a cluster specific inference system 146. The cluster specific inference system 146 reviews specific viewing history of a plurality of users and determines user preferences based on correlations between groups of various users. The global inference system 144 reviews specific viewing history of all or a sample of users for providing preferences based on shows that are the most popular. Regardless of the inference system being employed, the server or servers 140 transmit a set of recommendations to the set top box 160. Additional cluster specific inference systems can be provided for members of various clusters coupled to the server 140. The set top box 160 includes an electronic programming guide system 161 comprised of a user interface component 162 coupled to a filtering system 164. The set top box 160 also includes volatile memory storage 166 for catching live shows of interest. The server 140 and the program delivery system 142 are operable to understand both the electronic programming guide system 161 and individual subscriber viewing habits based on selections made at the set top box 160. These selections can be determined by requests made at the set top box 160 or alternatively by transmitting information from the set top box 160 back to the server 140. This information is logged and used to train the global and the cluster specific inference systems 144 and 146. The global and specific inference systems 144 and 146 are further operable to provide a set of recommendations to a user of the set top box 160 based on viewing habits within specific time intervals of the set top box 160. Providing the functionality of logging, training and recommending at the server eliminates the need for applications at the set top box allowing set top boxes with limited resources to be implemented at the client end. The filtering system 164 gives the user the ability to add, delete and modify results transmitted to the set box 160.

The global inference system 144 is operable to group client users into clusters based on all users viewing habits within time intervals employing the electronic programming guide system of the present invention. The global inference system 144 then utilizes this information to pre-generate a different recommendation set for each cluster of users. The recommendations do not necessarily rely on real time data, but can employ historical data periodically to determine a recommendation set. The global inference system 144 and the cluster specific inference system 146 can reside across one or more servers and/or be downloaded periodically to each individual set top box coupled to the server(s) 140.

Figure 8:
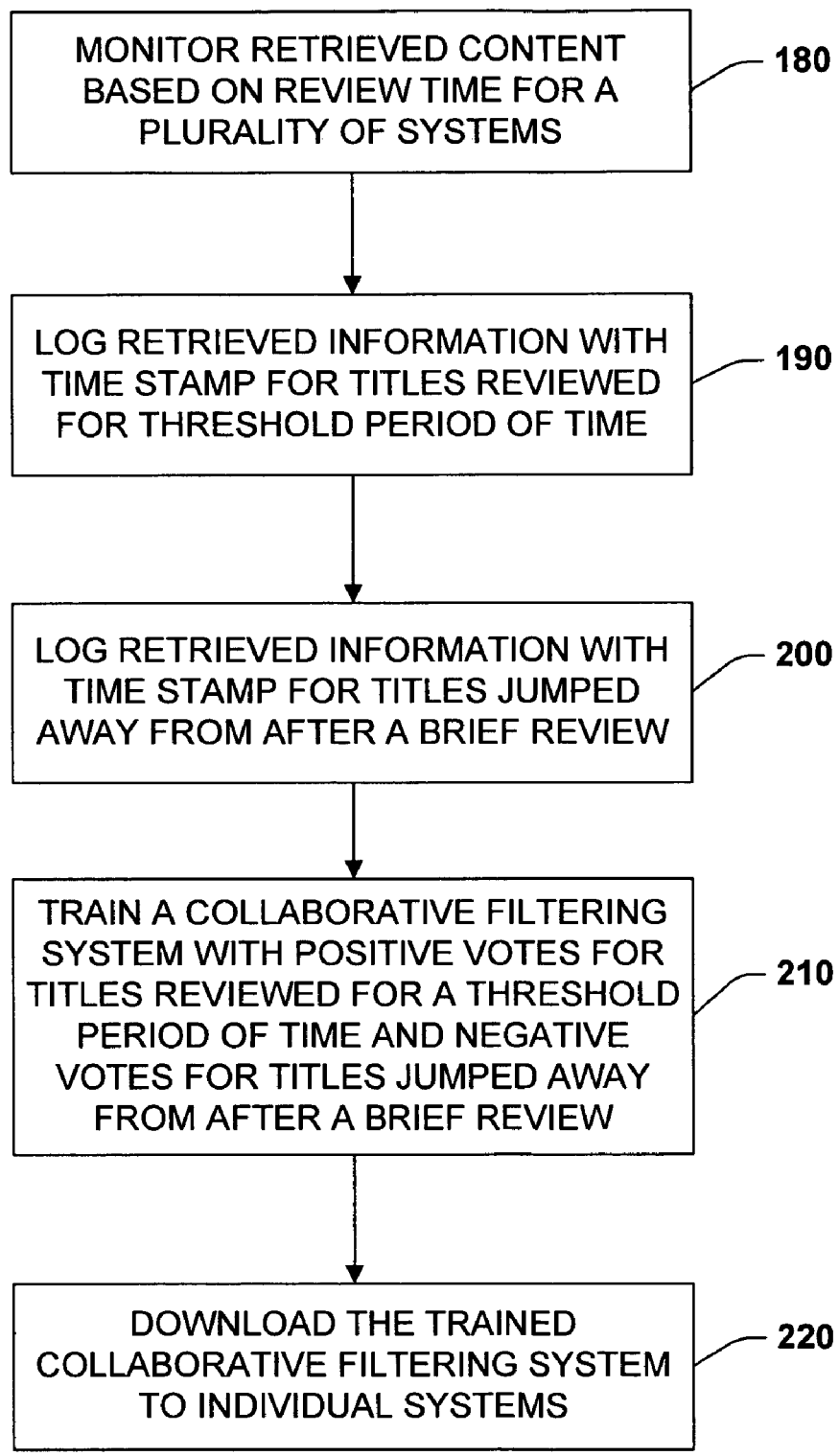
FIG. 8 illustrates a flow diagram of a methodology for training a collaborative filtering system in accordance with one aspect of the present invention.
Figure 9:
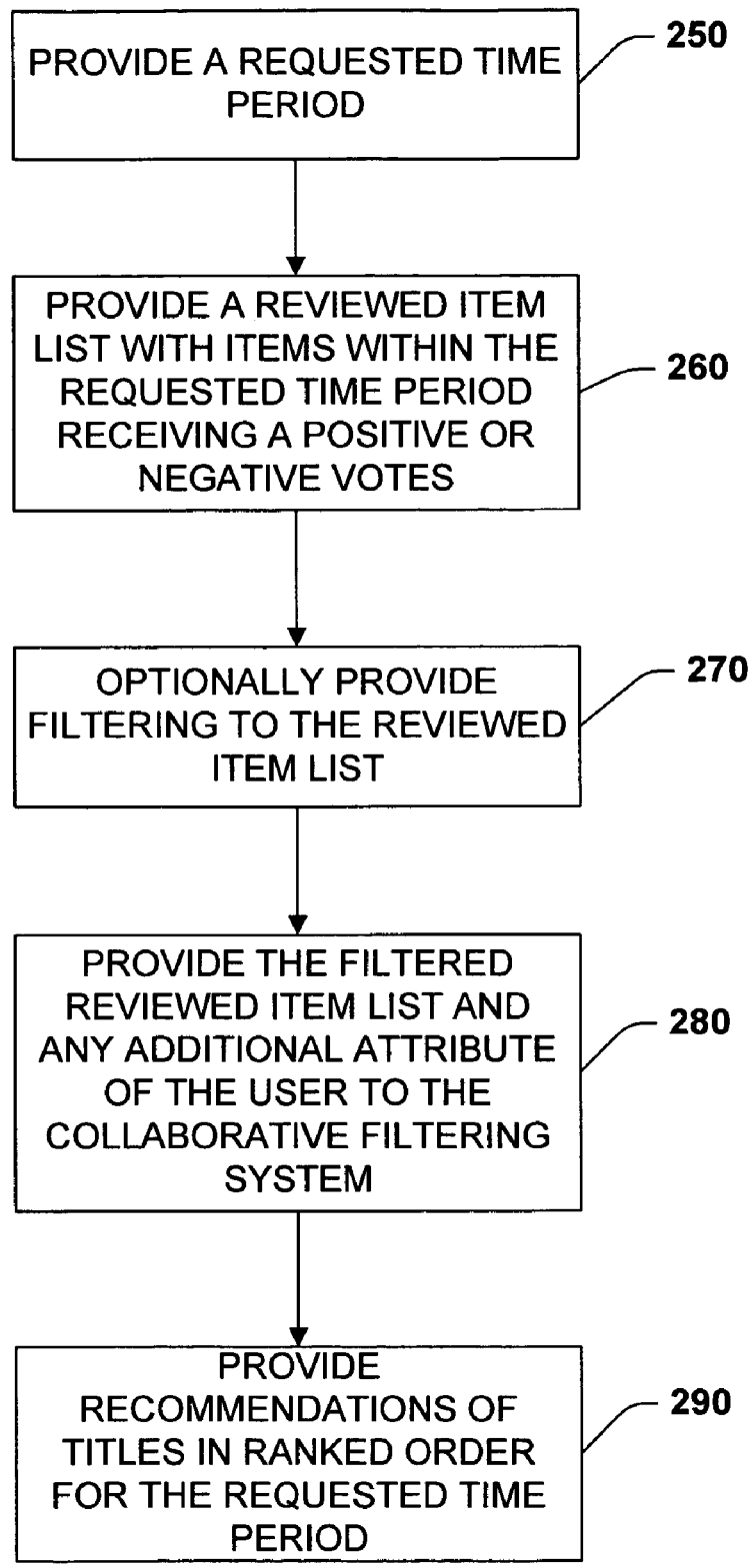
FIG. 9 illustrates a flow diagram of a methodology for providing a list of ranked general recommendations of employing the trained collaborative filter system in accordance with one aspect of the present invention.
Figure 10:
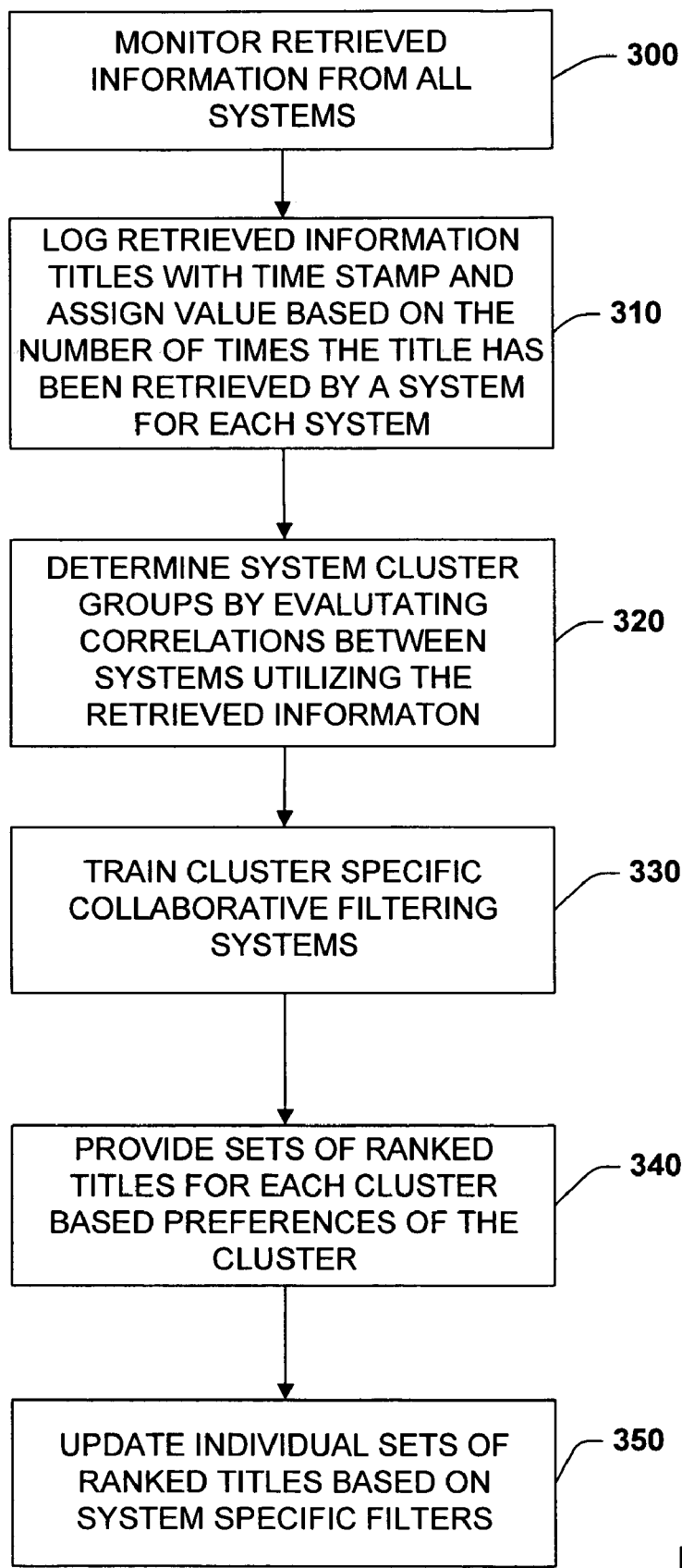
FIG. 10 illustrates a flow diagram of a methodology for identifying and training cluster specific collaborative filtering systems and providing ranked recommendations of titles based on cluster specific preferences in accordance with one aspect of the present invention.

In view of the foregoing structural and functional features described above, methodologies in accordance with various aspects of the present invention will be better appreciated with reference to FIGS. 8-10. While, for purposes of simplicity of explanation, the methodology of FIGS. 8-10 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

FIG. 8 illustrates one particular methodology for training and downloading a collaborative filtering system employing the temporal history of a plurality of systems. The methodology begins at 180 where retrieved content of a plurality of systems is monitored based on the time that the content is reviewed. Information that is retrieved and reviewed for a threshold period of time is logged and time stamped with the title in one or more databases at 190. Information that is retrieved and reviewed for a brief period of time and then jumped away from after a brief review is logged and time stamped with the title in the one or more databases at 200. The methodology then proceeds to 210 to train a collaborative filtering system. The collaborative filtering system is trained with positive votes assigned to titles reviewed for a threshold period of time and negative votes assigned to titles jumped away from after a brief review. At 220, the trained collaborative system is downloaded to the individual systems. The downloading can be done locally or from a remote link via a network.

FIG. 9 illustrates one particular methodology for providing a general recommendation set employing the trained collaboration filter system of the present invention. The methodology begins at 250 where a requested time period is provided to the collaborative filtering system from, for example, a user interface or the like. At 260, a reviewed item list is provided with items within the requested time period having indications of a positive or a negative vote associated with one or more items. Filtering may be provided to the reviewed item list at 270. For example, a user may selectively filter the reviewed item list via a user interface employing one or more filters to the reviewed item list. The collaborative filtering system then automatically updates the reviewed item list providing the selected filters and any additional attributes of the users of the system at 280. At 290, the collaborative filtering system provides recommendations of titles in ranked order for the requested time period after the reviewed list has been filtered with the one or more filters in addition to the information provided about additional attributes of users of the system.

FIG. 10 illustrates one particular methodology for providing a recommendation set by training and utilizing cluster specific collaboration filter systems according to one particular aspect of the present invention. The methodology begins at 300 where information retrieved by all of the systems is monitored. Titles of retrieved information are then time stamped and assigned a value based on the number of times the title has been retrieved by a system for each system at 310. At 320, system cluster groups are evaluated by determining correlations between systems utilizing the retrieved information habits of each system. At 330, cluster specific collaborative filtering systems are trained. At 340, sets of ranked titles are provided for each cluster by a cluster specific collaborative filtering system based on particular preferences of each cluster. The individual ranked titles are updated at the system utilizing system specific filters at 350.

Figure 11:
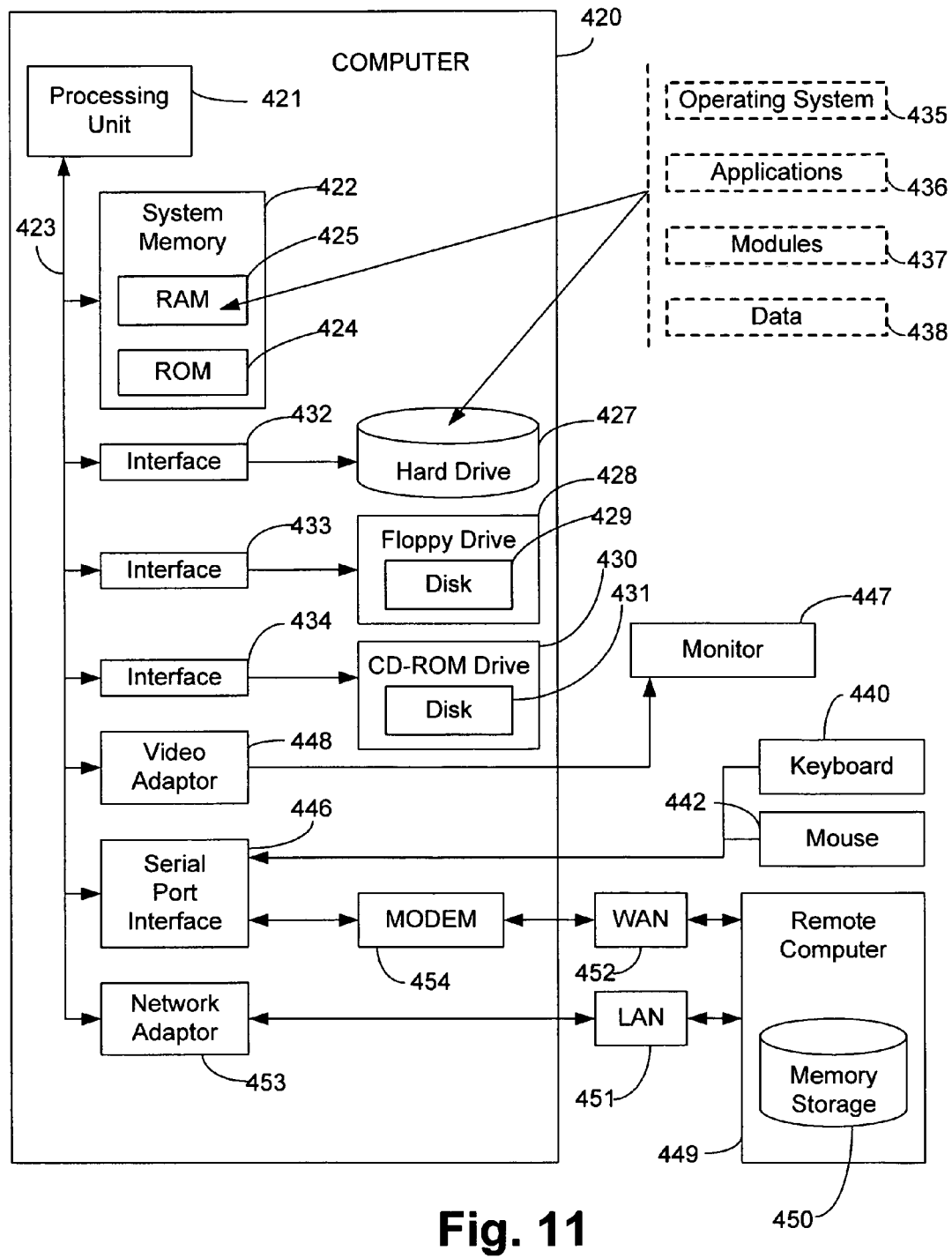
FIG. 11 illustrates a block diagram of a computer system in accordance with an environment of the present invention.

With reference to FIG. 11, an exemplary system for implementing the invention includes a conventional personal or server computer 420, including a processing unit 421, a system memory 422, and a system bus 423 that couples various system components including the system memory to the processing unit 421. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 421.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 424 and random access memory (RAM) 425. A basic input/output system (BIOS), containing the basic routines that help to transfer information between elements within the computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the server computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 425, including an operating system 435, one or more application programs 436, other program modules 437, and program data 438. A user may enter commands and information into the computer 420 through a keyboard 440 and pointing device, such as a mouse 442. Other input devices (not shown) may include a microphone, joystick, game pad, satellite dish, scanner, or the like. These and other input devices are often connected to the processing unit 421 through a serial port interface 446 that is coupled to the system bus, but may be connected by other interfaces, such as a parallel port, game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote computers, such as a remote server or client computer 449. The remote computer 449 may be a workstation, a server computer, a router, a peer device or other common network node, and typically includes many or all of the elements described relative to the computer 420, although only a memory storage device 450 has been illustrated in FIG. 11. The logical connections depicted in FIG. 11 include a local area network (LAN) 451 and a wide area network (WAN) 452. Such networking environments are commonplace in offices, enterprise-wide computer networks, intranets and the Internet.

When used in a LAN networking environment, the computer 420 is connected to the local network 451 through a network interface or adapter 453. When used in a WAN networking environment, the server computer 420 typically includes a modem 454, or is connected to a communications server on the LAN, or has other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 420, unless indicated otherwise. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and a particular example, however, it is to be appreciated that various programming methodology and/or computer architecture suitable for carrying out the present invention may be employed and are intended to fall within the scope of the hereto appended claims.

The invention has been described with reference to the preferred aspects of the invention. Obviously, modifications and alterations will occur to others upon reading and understanding the foregone detailed description. It is intended that the invention be construed as including all such modifications alterations, and equivalents thereof.

What is claimed is:

1. A method for ranking recommendations of multimedia program items in a selectable items list received from an information delivery system, wherein the method is implemented by a processor executing computer-executable instructions stored in computer-readable media, the method comprising:

establishing a threshold dwell time period, wherein when a viewer views a particular multimedia program item for longer than the threshold dwell time period, the particular multimedia program item is assigned a positive vote, wherein when the viewer views the particular multimedia program item for less than the threshold dwell time period, the particular multimedia program item is assigned a negative vote;

logging, by the processor, titles of multimedia program items viewed by a plurality of viewers and temporal history corresponding to the viewed multimedia program items in a database, wherein the temporal history is at least one time segment of a day or a week, wherein each multimedia program item that is viewed for more than the threshold dwell time period is logged with a positive vote, wherein each multimedia program item that is viewed for less than the threshold dwell time period is logged with a negative vote;

training a collaborative filtering system using the logged temporal history of the viewed multimedia program items, wherein the training takes into account both positive and negative votes logged based on the threshold dwell time period for multimedia program items during particular time intervals; and providing a changeable and selectable recommendation list for display in an electronic program guide in a television system, wherein the recommendation list is ordered by an estimated degree of preference for a viewer based on the trained collaborative filtering system and according to a target time period for viewing the multimedia program items.

2. The method of claim 1, further comprising providing a list of previously viewed multimedia program items to be displayed to the viewer, wherein the list of previously viewed multimedia program items includes an indication of whether each previously viewed multimedia program item listed received a positive vote or a negative vote.

3. The method of claim 2, further comprising receiving a selection from the viewer to change a positive vote on the list of previously viewed multimedia program items to a negative vote or to change a negative vote to a positive vote for one or more of the previously viewed multimedia program items listed; and updating the recommendation list in response to the selection received to change the vote for one or more of the previously viewed multimedia program items.

4. The method of claim 1, the step of logging titles of multimedia program items viewed by a plurality of viewers and temporal history corresponding to the viewed multimedia program items in a database comprising time stamping the titles of the viewed items according to event type and the collaborative filtering system comprising a single collaborative filtering model adapted to be trained based on time intervals during which the multimedia program items have been viewed.

5. The method of claim 1, the step of training the collaborative filtering system comprising utilizing a plurality of separate collaborative filtering models, each collaborative filtering model being trained with the multimedia program items from a particular time interval of temporal history that has been viewed.

6. The method of claim 1, the step of logging titles of multimedia program items viewed by a plurality of viewers and temporal history corresponding to the viewed multimedia program items in a database comprising time stamping the titles of the viewed multimedia program items according to event occurrence.

7. The method of claim 1, the collaborative filtering system comprising a single collaborative filtering model adapted to be trained based on time intervals during which the multimedia program items were viewed.

8. The method of claim 1, further comprising utilizing other attributes of one of the plurality of viewers of the viewed multimedia program items in the step of providing a selectable recommendation list ordered by estimated degree of preference that a viewer has for each multimedia program item.

9. The method of claim 1, the step of providing a selectable recommendation list of recommended multimedia program items ordered by estimated degree of preference that a viewer has for each multimedia program item comprising providing a globally ranked selection list to a cluster of systems based on the temporal viewing history of the other viewing systems of the cluster.

10. The method of claim 1, further comprising filtering a reviewed multimedia program items list, inputting the filtered reviewed multimedia program items list into the trained collaborative filtering system and generating a new selectable recommendation list of titles according to the preferences provided by the filtered reviewed multimedia program items list.

11. The method of claim 10, the step of filtering comprising applying at least one of a live show selection filter, a time period filter, a popularity filter, a pattern search engine and an adding multimedia program items of interest and update component to the reviewed multimedia program items list.

12. A filtering system for ranking recommendations of multimedia program items in a selectable list of multimedia program items received from an information delivery system, comprising:

a processor coupled to computer readable media, the computer readable media storing instructions adapted to be executed by the processor for:

logging titles of multimedia program items viewed by two or more viewers of a shared system and temporal history corresponding to the viewed multimedia program items in a database, wherein the temporal history is one or more time segments, wherein each multimedia program item that is viewed for more than a threshold dwell time period is logged with a positive vote, wherein each multimedia program item that is viewed for less than the threshold dwell time period is logged with a negative vote;

retrieving the logged titles and the temporal history corresponding to the viewed multimedia program items and vote information from the database;

employing collaborative filtering techniques on the temporal history of the viewed multimedia program items and a selection list of available titles to order an editable recommendation list by estimated degree of preference that a present viewer has for each item, wherein the ordering takes into account both positive and negative votes logged based on the threshold dwell time period for multimedia program items during particular time intervals; and providing the editable recommendation list to the present viewer of a viewing system.

13. The filtering system of claim 12, wherein the processor provides a list of previously viewed multimedia program items to be displayed to the viewers, wherein the list of previously viewed multimedia program items includes an indication of whether each previously viewed multimedia program item listed received a positive vote or a negative vote collaborative filtering techniques further comprise utilizing other attributes of the user of the viewed information.

14. The filtering system of claim 12, wherein the processor receives a selection from one or more of the viewers to change a positive vote on the list of previously viewed multimedia program items to a negative vote or to change a negative vote to a positive vote for one or more of the previously viewed multimedia program items listed, and updates the recommendation list in response to the selection received to change the vote for one or more of the previously viewed multimedia program items collaborative filtering techniques further comprising for utilizing attributes of other viewing systems.

15. The filtering system of claim 12, wherein the collaborative filtering techniques further comprise providing a globally ranked selection list to a cluster of viewing systems in communication with the filtering system based on the temporal viewing history of other viewing systems of the cluster.

16. The filtering system of claim 12, further comprising filtering a reviewed item list, the filtered reviewed items list being a preference input into the filtering system for employing collaborative filtering techniques.

17. The filtering system of claim 12, wherein a viewing system comprising a television receives the ranked selectable list in an electronic program guide.

18. A method for providing a personalized recommendation list of titles of multimedia program items, wherein the method is implemented by a processor executing computer-executable instructions stored in computer-readable media, the method comprising:

establishing a threshold dwell time period, wherein when a viewer views a particular multimedia program item for longer than the threshold dwell time period, the particular multimedia program item is assigned a positive vote, wherein when the viewer views the particular multimedia program item for less than the threshold dwell time period, the particular multimedia program item is assigned a negative vote;

logging titles of multimedia program items viewed by a viewer of a viewing system and temporal history corresponding to the viewed information in a database, wherein the temporal history is a time interval during which the information is viewed, wherein each multimedia program item that is viewed for more than a threshold dwell time period is logged with a positive vote, wherein each multimedia program item that is viewed for less than the threshold dwell time period is logged with a negative vote;

retrieving the logged titles and the temporal history corresponding to the viewed multimedia program items and vote information from the database;

employing collaborative filtering techniques on the temporal history of the viewed information and a selection list of available titles to order an editable recommendation set by estimated degree of preference that a current viewer has for each item, wherein the recommendation list is selectable by time segment, wherein the ordering takes into account both positive and negative votes logged based on the threshold dwell time period for multimedia program items during particular time intervals;

providing the editable recommendation set to the current viewer of the viewing system;

providing a list of previously viewed multimedia program items to be displayed to the current viewer, wherein the list of previously viewed multimedia program items includes an indication of whether each previously viewed multimedia program item listed received a positive vote or a negative vote;

receiving a selection from the current viewer to change a positive vote on the list of previously viewed multimedia program items to a negative vote or to change a negative vote to a positive vote for one or more of the previously viewed multimedia program items listed; and updating the recommendation list in response to the selection received to change the vote for one or more of the previously viewed multimedia program items.

* * * * *

UNITED STATES PATENT AND TRADEMARK OFFICE
CERTIFICATE OF CORRECTION

PATENT NO. : 7,644,427 B1 Page 1 of 1
APPLICATION NO. : 11/047169
DATED : January 5, 2010
INVENTOR(S) : Eric J. Horvitz et al.

It is certified that error appears in the above-identified patent and that said Letters Patent is hereby corrected as shown below:

On the Title Page, please replace the Title with the following corrected Title:

(54) TIME-CENTRIC TRAINING, <u>INFERENCE</u> ~~INTERFERENCE~~ AND USER INTERFACE FOR PERSONALIZED MEDIA PROGRAM GUIDES

At col. 1, lines 1-4, please replace the Title with the following corrected Title:

TIME-CENTRIC TRAINING, <u>INFERENCE</u> ~~INTERFERENCE~~ AND USER INTERFACE FOR PERSONALIZED MEDIA PROGRAM GUIDES

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,644,427 B1 | Page 1 of 1 |
| APPLICATION NO. | : 11/047169 | |
| DATED | : January 5, 2010 | |
| INVENTOR(S) | : Eric J. Horvitz et al. | |

It is certified that error appears in the above-identified patent and that said Letters Patent is hereby corrected as shown below:

In Title page, in Item (54), column 1, line 2, delete "INTERFERENCE" and insert -- INFERENCE --, therefor.

In column 1, line 2, delete "INTERFERENCE" and insert -- INFERENCE --, therefor.

In column 17, line 54, in Claim 4, after "type" insert -- , --.

Signed and Sealed this
Fifteenth Day of March, 2011

David J. Kappos
*Director of the United States Patent and Trademark Office*